March 10, 1942. H. G. LEHMANN 2,276,216
COFFEE MAKER
Filed Sept. 7, 1940 2 Sheets-Sheet 1
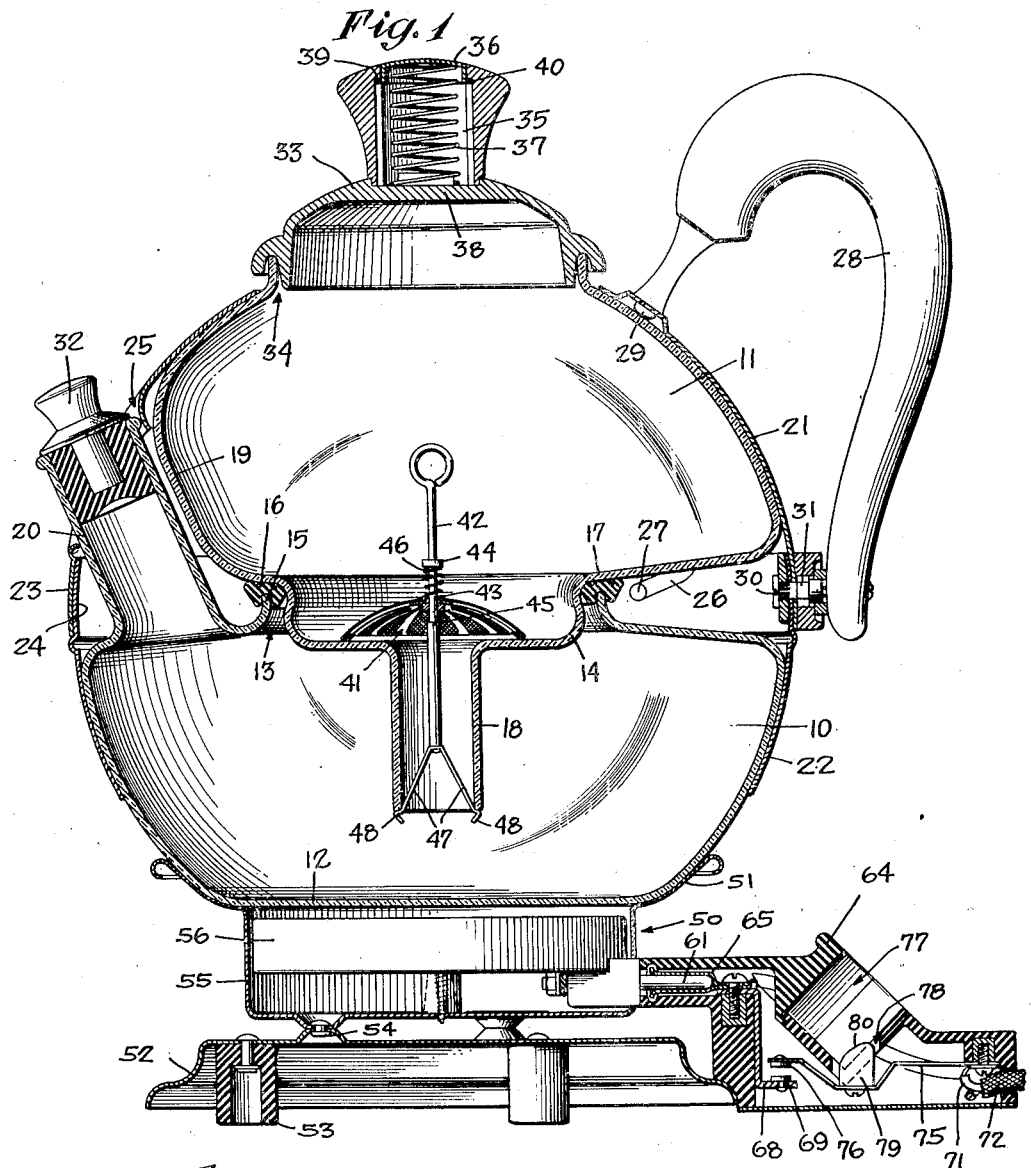
INVENTOR
Herbert G. Lehmann
BY
ATTORNEYS March 10, 1942.　　　H. G. LEHMANN　　　2,276,216
COFFEE MAKER
Filed Sept. 7, 1940　　　2 Sheets-Sheet 2

INVENTOR
Herbert G. Lehmann
BY Johnson, Kline and Smyth
ATTORNEYS

Patented Mar. 10, 1942

2,276,216

UNITED STATES PATENT OFFICE 2,276,216

COFFEE MAKER

Herbert G. Lehmann, Bridgeport, Conn., assignor to Casco Products Corporation, Bridgeport, Conn., a corporation of Connecticut Application September 7, 1940, Serial No. 355,785

13 Claims. (Cl. 219—43)

This invention relates to coffee making appliances, and, more particularly, to the type in which water in a closed lower vessel is heated and forced by the pressure formed above the water, due to heating of the same, up through ground coffee in an upper vessel, and then subsequently drawn down through the ground coffee as a result of a partial vacuum being formed in the lower or water heating vessel upon cooling of the latter. This type of appliance has been termed a vacuum type coffee maker.

The appliance of the present invention, as the two vessels are mechanically held together as one, permits coffee to be brewed and served at the dining table without the inconvenience and bother which is now attendant upon the removal and storage of the steeping vessel after the coffee is brewed and before it may be served.

To facilitate the serving of the brewed coffee, the appliance of the present invention is provided with a pouring spout formed on the lower vessel and through which the brewed coffee may be poured. This spout is completely sealed by a suitable stopple during the brewing of the coffee and prevents any egress of air into the lower vessel so that the action of the appliance is in no way impaired.

To prevent the stopple used with the pouring spout from becoming lost after the coffee is brewed, and it is desired to serve the same, the stopple may be conveniently stored in a cap closing an opening in the upper vessel.

To permit the appliance of the present invention to be used at the table side, a heater or stove is provided for heating the water in the lower vessel to effect the infusion of the water with the ground coffee held in the upper vessel.

In the broader aspects of the present invention, any heater may be used which may be controlled so that the temperature of the lower vessel may be controlled, but in the embodiment of the invention herein shown, the heater comprises a pair of series connected resistance units carried by a suitable support which also supports the coffee maker while in use.

To control the temperature of the lower vessel, the present invention provides means for selectedly energizing one of the units or both as desired. One unit preferably has lesser resistance than the other so that when this unit is energized a high heat is developed, but, when the two units are series energized, the heat then developed is considerably less and only of a temperature sufficient to maintain the brewed coffee warm.

The opposite ends of the units are each connected to connector prongs carried by the support while the connected ends are suitably attached by a conductor to a third prong.

The low resistance unit may be separately energized by connecting two of the prongs by a heater plug and conductor to a source of current.

When it is desired to reduce the temperature of the heater, the plug may be removed from the two prongs and attached to the prongs connected to the opposite ends of the units to effect a series energization of the same which, as will be understood, reduces the current flow, and, consequently, the temperature of the heater.

To effect a control of the heat developed without the necessity of removing the heater plug from two of the prongs to cause it to engage with a different pair of prongs, the present invention provides a novel form of connector plug. The connector plug of the present invention is provided with three prong-receiving sockets so that all three of the heater prongs may be engaged by a socket of the heater plug. The sockets receiving the prongs connected to the opposite ends of the series connected resistance units are connected to conductors leading to a source of current while the prong which is led to the coupling between the two resistance units is engaged by a socket connected to one of the conductors leading to the source of current by a normally open auxiliary circuit. This circuit contains a switch having one contact normally biased to an open-circuit position so that the resistance units, when the connector plug is attached to the three prongs, are series energized. To remove the high resistance unit from the heater circuit, it is only necessary to depress and hold depressed the normally open switch which short circuits the high resistance unit from the heater circuit. The sole energization of the low resistance unit develops a relatively high heat.

In the broader aspects of the invention, any means may be employed for closing the switch, but, in the preferred form of the invention as herein shown, the closing of the switch is effected by the storage of the stopple in a suitable storage well formed in the connector plug.

To permit the storage of the stopple in the well to close the normally open switch, the movable element of the switch is made resilient and is normally held out of engagement with a fixed contact, but is moved and held in engagement with the fixed contact by the physical presence of the stopple in the well of the plug. The closing of the switch by the storage of the stopple in the well shunts from the heating circuit the high resistance unit so that the low resistance unit alone is energized.

The water in the lower vessel will not rise into the upper vessel unless the pouring spout of the lower vessel is first sealed against the passage of air so that to effect an infusion the stopple must be removed from the well of the plug and placed in the spout of the lower vessel. The removal of the stopple from the well of the plug automatically opens the switch and places the high resistance unit again in series with the low resistance unit and the joint energization of the units reduces the heat supplied to the lower vessel so that the same may cool to permit the now brewed coffee to be drawn back down into the lower vessel.

It is desirable, however, that the water be held up in the upper vessel for a predetermined time to permit a proper infusion with the ground coffee. The appliance of the present invention is so designed that the heater unit does not cool quickly after the shunt circuit is opened, but rather retains sufficient temperature to maintain the lower vessel at a temperature to hold the water up in the upper vessel for a time necessary to insure a proper infusion of the water and ground coffee.

This is accomplished by the present invention by disposing the heating elements in a refractory plate housed within a casing so formed as to preclude air drafts which would tend to cool the elements, refractory plate or casing. The heat retained by the heater is, therefore, sufficient to cause the water if brought to boiling before the removal of the stopple to be driven up into the upper vessel and held therein to infuse with the ground coffee for a predetermined time sufficient to insure a proper infusion.

The lower vessel, although warmed by the series connected elements, will cool sufficiently to allow the brewed coffee to return after the predetermined elapse of time to the lower vessel from which it may be served through the pouring spout. When it is desired to serve the brewed coffee, the stopple may be removed from the pouring spout and stored in the cap closing the opening in the upper vessel.

Other features and advantages will hereinafter appear.

In the accompanying drawings:

Figure 1 is a vertical sectional view of the coffee maker of the present invention with the parts in the position they occupy during the brewing operation.

Fig. 2 is a fragmentary view, partly in section, showing the connector plug of the present invention.

Figure 3:
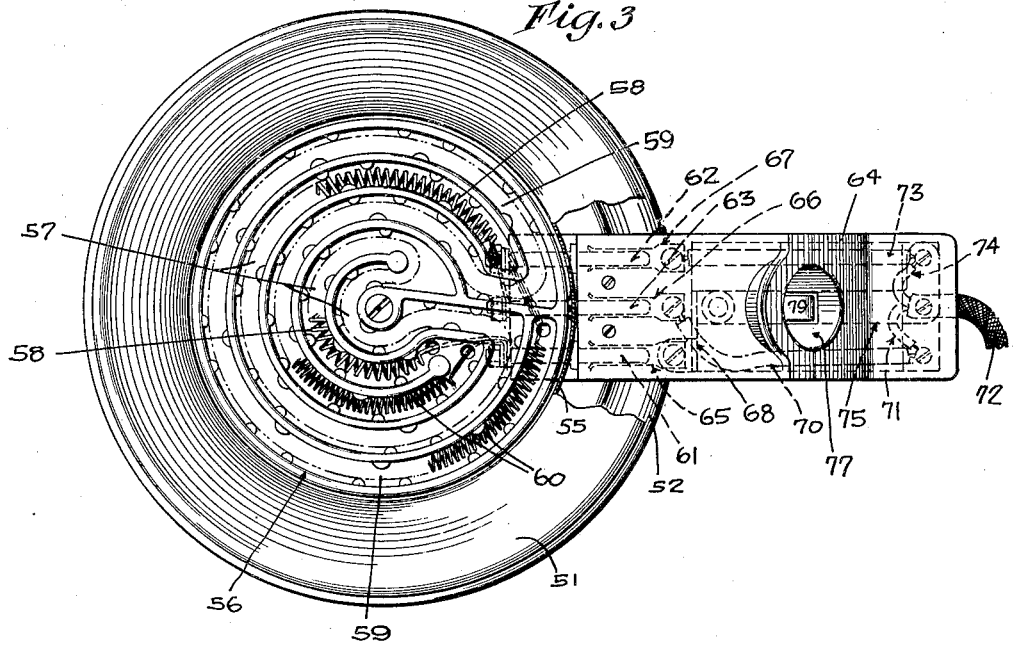
Fig. 3 is a plan view, with some details shown in broken lines, of the heater of the present invention.

As shown in the accompanying drawings, referring particularly to Fig. 1, the coffee maker of the present invention comprises a lower or water vessel 10 and an upper or steeping vessel 11, both vessels being approximately hemispherical and having their relatively flat sides juxtaposed so that when they are assembled the two vessels form a substantially spherical body.

The bottom of the lower vessel 10 is provided with a flat surface or base 12 by means of which the appliance may be supported upon a suitable surface, and at its upper end the vessel 10 has a relatively wide open mouth 13 adapted to receive a sump portion 14 of the steeping vessel 11. A lip 15 of the mouth 13 supports a gasket 16 of rubber or other suitable material which is engaged by a bottom portion 17 of the steeping vessel 11 and supports the steeping vessel on the lower vessel with the sump 14 extending into the lower vessel. The steeping vessel has the usual downwardly extending tube 18 through which water contained within the bottom vessel 10, when heated, will pass upwardly through ground coffee in the sump 14 and into the steeping vessel 11 when the coffee is brewed.

As shown in Fig. 1, the steeping vessel is suitably shaped as at 19 to provide clearance for an upwardly extending spout 20 communicating with the lower vessel 10, and through which the brewed coffee may be poured.

According to the present invention, the lower vessel 10 and the upper or steeping vessel 11 are held together as a unit, and, for this purpose, any suitable means may be employed. In the now preferred form of the invention, the two vessels are united by a pair of properly shaped casings 21 and 22, overlying and underlying respectively the largest dimensions of the vessels 11 and 10. These casing parts are provided with overlying marginal portions 23 and 24 which are suitably secured together. The upper casing 21 is provided with an aperture 25 through which the pouring spout 20 of the lower vessel extends.

The casing parts 21 and 22 may be secured together by any suitable means, but preferably are secured together by bayonet locks comprising slots 26 formed in the casing part 22 and pins 27 carried by the casing part 21. After the vessels 10 and 11 are superposed, the parts 21 and 22 are placed over and under the vessels so that the pins 27 enter the slots 26, whereupon the lower casing part is turned relative to the upper casing part causing the parts to be drawn together by the inclined walls of the slots.

The appliance of the present invention is preferably provided with a handle to facilitate handling of the appliance, and, as herein shown, the handle 28 is secured at the upper end to casing part 21 by a rivet 29 and at the lower end is secured to the overlapped portions of the casing parts by a screw member 30 which is passed through suitably aligned apertures formed in the overlapped portions of the casing parts and threaded into a nut member 31 carried by the handle adjacent the lower end thereof.

It is necessary to prevent the escape of air and water vapor from the lower vessel 10 as the water is heated because it is the expansion of the air and water vapor above the water level in the lower vessel which forces the water therein to rise in the tube 18 and enter the steeping vessel. To prevent the loss of air and water vapor from the lower vessel 10, the spout 20 is provided with a stopple 32 which is removed when it is desired to pour or serve the brewed coffee.

To prevent the stopple 32 from being misplaced when it is removed from the pouring spout, there is formed in a cap 33 closing an opening 35 in the upper vessel 11 of the appliance, illustrated in Fig. 1, a suitable receptacle for receiving the stopple. This receptacle comprises a well 35 normally closed by a flanged disk 36 resiliently held in the position, shown in Fig. 1, by a coil spring 37 seating on the bottom wall 38 of the well. The well is provided with an annular downwardly facing shoulder 39 against which the flange 40 of the disk 36 is held by the spring 37 to limit the upper movement of the disk. The disk 36 may be easily depressed and the stopple 32, when removed from the pouring spout, may be inserted into the well and frictionally held therein against the action of the spring.

To prevent coffee grounds held by the sump 14 from being drawn down through the tube 18 into the lower vessel after the brewing operation, a suitable filter or strainer is used to retain the coffee grounds in the sump.

In the broader aspects of the invention, any suitable filter or strainer may be used, but, in the invention herein disclosed, this is accomplished by providing a filter received in the sump 14 and held over the opening at the upper end of the tube 18. The filter, as shown, may be covered with some suitable cloth to strain the brewed coffee and prevent the grounds from passing down into the lower vessel.

In the previously proposed coffee makers of this type, various means have been employed for holding the filter over the opening at the upper end of the tube so that coffee grounds cannot be drawn down into the lower vessel after the coffee has been brewed. In many of these previous devices, the means employed for properly seating the filter over the usual tube 18 have been cumbersome and difficult to use, and, consequently, were a source of annoyance to a user of a coffee maker of this type.

To obviate this annoyance, the filter of the present invention comprises an apertured dome-shaped metallic member 41 about which is preferably fitted a suitable filter cloth or the like. The dome-shaped member 41 is provided with a small rod-like handle 42 extending upwardly therefrom to facilitate handling of the filter.

The handle 42 is slidably carried by a suitable bearing 43 secured to the dome-shaped member 41 and projects downwardly beneath the latter. The sliding movement of the handle 42 relative to the dome-shaped member 41 is limited by a collar 44 carried by the handle adjacent the upper end and a shoulder 45 formed on the lower projecting portion of the same. A coil spring 46 disposed about the handle 42 seats on the bearing 43 and works against the underneath side of the collar 44 to normally urge the handle 42 upward to the limit of movement allowed by the shoulder 45.

The handle carries at its lower end, which is disposed within the tube of the upper vessel 11, a plurality of spring fingers 47 formed with catch members 48 which are adapted to engage the lower edge of the tube when the handle 42 is depressed against the action of the spring 46. The spring fingers, due to their engagement with the lower edge of the tube, normally retain the filter tightly against the bottom wall of the sump and disposed over the tube 18.

To heat the water in the lower vessel, the present invention includes a stove 50 comprising a stand-like unit provided with a suitably formed seat 51 upon which the lower vessel 10 rests. The stove, referring now particularly to Fig. 1, comprises a suitable base plate 52 provided with a series of supporting feet 53. Secured to the base plate 52 by rivets or other suitable fastening means 54 is a casing 55 terminating in an imperforate rim forming a seat 51 upon which the lower vessel rests.

Figure 4:
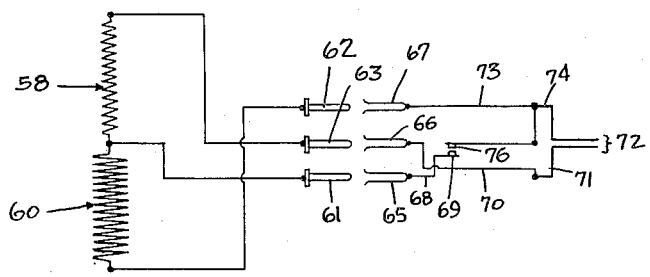
Fig. 4 is a diagrammatic sketch of the circuits employed in the heater of the present invention with a diagrammatic showing of the lead wires of the connector plug.

The casing 55 houses a disk 56 of refractory material which has its upper face, referring now to Figs. 3 and 4, formed with a series of connected grooves 57 receiving the helical resistance wire 58. A second series of grooves 59 also receives a helical resistance wire 60 but of a different size and offering a different resistance than the resistance wire 58.

The one end of each resistance wire is led to a connector prong 61 carried by the wall of the casing 55 and projecting therefrom. The opposite end of the resistance wire 60 is connected by a suitable lead to a second connector prong 62 also carried by the wall of the casing 55 and projecting therefrom.

The opposite end of the resistance wire 58 which, preferably, has a lower resistance than wire 60, is connected to a third prong 63 preferably spaced intermediate the prongs 61 and 62.

The prongs permit the resistance wires 58 and 60 to be conveniently connected by means of a heater plug and cord to a source of current.

It will be seen that by disposing the prongs 61 and 63 within the usual sockets of a heater plug, which is connected to a source of current, will energize the low resistance unit 58, which, upon energization, develops a relatively high temperature but that when the heater plug is removed from the prongs 61 and 63 and connected to the prongs 62 and 63, the resistance wires are series energized and this energization of the units causes a reduction in the current flow, and, conseqeuntly, a reduction in the temperature developed.

To permit a more convenient control of the heat developed without the necessity of removing the heater plug from two of the prongs to cause it to engage with a different pair of prongs, the present invention provides a novel connector plug.

The connector plug of the present invention, referring now to Fig. 1, comprises a body 64 of suitable insulating material carrying socket members 65, 66 and 67 for receiving the prongs of the casing. Socket member 65 is electrically connected to a rigid arm 68 carried by the connector plug and supporting a contact member 69 adjacent the one end thereof.

Socket 66 is connected by a wire 70 to conductor 71 of a twin conductor cord 72 leading to a source of current. Socket 67 is connected by wire 73 to the other conductor 74 of the twin conductor cord 72. Conductor 74 is also electrically connected to a resilient arm 75 carrying at its outer end a contact 76. The resiliency of the arm 75 normally holds the contact 76 out of engagement with contact 69, but permits the arm 75 to be depressed so that contact 76 may be moved into engagement with the contact 69.

It will be seen, referring now to Fig. 4, that with the connector plug attached to the prongs of the casing, a circuit will be established through conductors 74, 73, socket member 67, prongs 62, resistance wires 60 and 58, prongs 63, socket 66, wire 70 and thence to conductor 71 to the cord 72.

The resistance wires 58 and 60 are series connected in this circuit and the heat developed, as will be understood, will be a relatively low one. The closing of the contacts 76 and 69, referring again to Fig. 4, will shunt from the heating circuit the resistance wire 60 so that the low resistance wire 58 will alone be energized to generate therein a relatively high temperature.

It will be now understood that the heat generated by the heating units may be controlled without necessitating the removal of the plug from the casing wall, and, in the broader aspects of the invention, any means may be employed to close the contacts 76 and 69, but, in the preferred form of the invention, the contacts are closed through the instrumentality of the stopple 32.

To permit this control, the plug is provided with a well 77 adapted to receive the stopple 32. The wall of the well 77 is broken away, as at 78, to permit a lug 79 provided with a cam surface 80 to project into the interior of the well 77. The storage of the stopple 32 in the well 77, as shown in Fig. 2, due to the engagement between the stopple and the cam surface 80 of the lug 79 cams the resilient arm 75 downward to bring the contact 76 into engagement with the contact 69. The engagement of the two contacts, as just previously explained, short circuits the resistance wire 60 so that the resistance wire 58 is alone energized and a relatively high heat is supplied to the lower vessel.

In the use of the device of the present invention, after the lower vessel has been properly filled with water and the ground coffee placed in the upper vessel, the maker is placed on the seat 51 and the stopple 32 deposited in the well 77. The storage of the stopple 32 in the well 77 closes the contacts 76 and 69, and the low resistance wire 58 is energized to supply to the lower vessel a relatively high temperature which quickly brings the water in the lower vessel to a boiling temperature.

When it is desired to brew the coffee, the stopple 32 is removed from the well 77 and placed in the pouring spout 20, and the closing of this orifice to the atmosphere causes a pressure to be developed above the surface of the water in the lower vessel which forces or drives the water up into the upper vessel to infuse with the ground coffee therein. The removal of the stopple 32 from the well 77 automatically opens the switch 76, 69 and the temperature of the lower vessel is consequently reduced by the series energization of the wires 58 and 60. The heater will retain sufficient heat, however, to drive the water up into the upper vessel, and, as the lower vessel is now quickly cooled after the stopple is placed in the pouring spout 20, the water will be held up in the upper vessel for a predetermined length of time to insure a proper infusion with the ground coffee. The lower vessel will, however, cool sufficiently after a predetermined elapse of time to permit a partial vacuum to be formed therein which allows the brewed coffee to be returned to the lower vessel.

To prevent the heater from cooling quickly after the resistance wire 60 is placed again in the circuit, the casing 55 as well as its rim forming the seat 51 is made preferably imperforate so that there are no cooling air drafts which might cool the heater, and, consequently, the lower vessel, which, upon cooling, would allow the brewed coffee to return to the latter before the time desired.

The stopple 32 may be removed from the pouring spout 20 after the brewed coffee has returned to the lower vessel and placed in the well 35 of the cap 33.

The filter and mounting means therefor shown herein are described and claimed in my copending application Serial No. 355,662, filed September 6, 1940.

Variations and modifications may be made within the scope of this invention and portions of the improvements may be used without others.

I claim:

1. In combination with a vacuum type coffee maker comprising a lower vessel and an upper vessel superposed on the lower vessel and having a tube extending into the lower vessel; a spout on said lower vessel for pouring coffee therefrom; means for closing said spout to permit the water when heated in the lower vessel to be forced up in the upper vessel to infuse with coffee therein and permit the brewed coffee to be drawn back down in the lower vessel upon cooling of the latter; means for heating the water in said lower vessel comprising a main heating resistance element and an auxiliary resistance element associated therewith; means for alternately connecting said main heating resistance directly to a source of current or in series circuit with said auxiliary resistance element, said means comprising a plug detachably connected to said heating means and having a shunt circuit for shunting the auxiliary resistance element from the main heating element; and means carried by said plug for storing said spout-closing means, the storage of said spout-closing means in the last-named means energizing said shunt circuit and the removal to close said spout opening said shunt circuit to connect said resistance element in series circuit with said main heating element to lower the temperature thereof.

2. A vacuum type coffee maker comprising a lower vessel and an upper vessel superposed on the lower vessel and having a tube extending into the lower vessel which is provided with a pouring spout; means for closing the spout so that water when heated in the lower vessel will be driven up into the upper vessel and returned to the lower vessel after the lower vessel has cooled; electric heating means including a circuit having a plurality of resistance units for heating the water in the lower vessel; means for removably connecting said elements to a source of current; means carried by said last-named means for reducing the current flow through said circuit to reduce the operating heat of said elements, said means comprising means for storing said spout-closing means and operative upon the removal of said spout-closing means from said storing means to close said spout to reduce the current flow.

3. A vacuum type coffee maker comprising a lower vessel and an upper vessel superposed on the lower vessel and having a tube extending into the lower vessel which is provided with a pouring spout; means for closing the spout so that water when heated in the lower vessel will be driven up into the upper vessel and returned to the lower vessel after the lower vessel has cooled; electric heating means including a circuit having a plurality of resistance units for heating the water in the lower vessel; means for removably connecting said elements to a source of current; and means carried by said last-named means for controlling the circuit to vary the effective resistance of said units to effect a control of the heat generated in said units, said means including storage means for said spout-closing means whereby the presence of the spout-closing means causes a high heat to be generated in said units and a low heat when the spout-closing means is removed to close the spout.

4. A vacuum type coffee maker comprising a lower vessel and an upper vessel superposed on the lower vessel and having a tube extending into the lower vessel which is provided with a pouring spout; means for closing the spout so that water when heated in the lower vessel will be driven up into the upper vessel and returned to the lower vessel after the lower vessel has cooled; electric heating means including a circuit comprising a main resistance element, a second element electrically associated with the heating means; and means for alternately connecting said main resistance element directly to a source of current or in series circuit with said last-named resistance element, said means comprising a detachable plug formed with storage means for said spout-closing means and having a fixed contact electrically connected to said circuit and a movable member normally out of engagement with said fixed contact but movable into engagement with said fixed contact upon storage of the spout-closing means in said plug, the removal of said spout-closing means from said plug to close said spout disengaging said contacts and connecting said second-named resistance element in series circuit with said main resistance element to lower the temperature thereof.

5. In a coffee maker, electric resistance means; a vacuum type coffee maker comprising a lower vessel and an upper vessel superposed on the lower vessel and having a tube extending into the lower vessel through an aperture therein; a pouring spout on said lower vessel; means for closing said spout; means for removably connecting said resistance means to a source of current; means carried by said last-named means for receiving and storing said spout-closing means; a normally open circuit carried by said connecting means; and means in said circuit for closing the same, upon the storage of the spout-closing means in said storing means, to shunt out a part of said electric resistance means whereby a high temperature is attained by the resistance means energized to quickly bring the water in the lower vessel to a high temperature.

6. In a vacuum type coffee maker comprising a lower vessel having an upper vessel superposed thereon, said upper vessel having a tube extending into said lower vessel through an aperture thereon; a cap closing an opening in said upper vessel; a circuit including an electric heating element and an auxiliary resistance for heating the lower vessel; means for controlling the temperature of the lower vessel, said means comprising means for removably connecting said circuit to a source of current, a contact fixed to said connecting means and electrically connected to said circuit, a movable contact, and means for engaging said movable contact to hold it in engagement with said fixed contact whereby said resistance element is cut out of the circuit to increase the temperature thereof, said means removable from said connecting means to allow the movable contact to separate from said fixed contact whereby said resistance element is connected in series circuit with the heating element to lower the temperature thereof, and means on said cap for receiving and storing said last-named means when the same is removed from said connecting means.

7. In a vacuum type coffee maker comprising a lower vessel having an upper vessel superposed thereon, said upper vessel having a tube extending into said lower vessel through an aperture therein; a cap closing an opening in said upper vessel; a circuit including an electric heating element and an auxiliary resistance element for heating the lower vessel; means for controlling the temperature of the lower vessel, said means comprising a connector plug, a fixed contact carried by said plug and electrically connected to said circuit, a movable contact carried by said plug and normally held out of engagement with said fixed contact, and means removably carried by said plug for holding said contacts in engagement whereby said resistance element is cut out of said circuit to increase the temperature of the heating element, the removal of said last-named means from said plug permitting the contacts to separate whereby said resistance element is connected in series circuit with said heating element to lower the temperature thereof, and means on said cap for receiving and storing said last-named means when the same is removed from said plug.

8. In a vacuum type coffee maker comprising a lower vessel having an upper vessel superposed thereon, said upper vessel having a tube extending into said lower vessel through an aperture therein; a circuit including an electric heating element and an auxiliary resistance for heating the lower vessel; and means for controlling the temperature of the lower vessel, said means comprising a connector plug, a fixed contact carried by said plug and electrically connected to said circuit, a movable contact carried by said plug and normally held out of engagement with said fixed contact, and means removably carried by said plug for holding said contacts in engagement whereby said resistance element is cut out of said circuit to increase the temperature of the heating element, the removal of said last-named means from said plug permitting the contacts to separate whereby said resistance element is connected in series circuit with said heating element to lower the temperature thereof, said last-named means comprising means for closing a pouring spout formed on said lower vessel so that the water when heated in the lower vessel will be forced up into the upper vessel to infuse with coffee therein.

9. In a vacuum type coffee maker comprising a lower vessel having an upper vessel superposed thereon, said upper vessel having a tube extending into said lower vessel through an aperture therein; a circuit including an electric heating element and an auxiliary resistance for heating the lower vessel; means for controlling the temperature of the lower vessel, said means comprising a connector plug, a fixed contact carried by said plug and electrically connected to said circuit, a movable contact carried by said plug and normally held out of engagement with said fixed contact, and means removably carried by said plug for holding said contacts in engagement whereby said resistance element is cut out of said circuit to increase the temperature of the heating element, the removal of said last-named means from said plug permitting the contacts to separate whereby said resistance element is connected in series circuit with said heating element to lower the temperature thereof, said last-named means comprising means for closing a pouring spout formed on said lower vessel so that the water when heated in the lower vessel will be forced up into the upper vessel to infuse with coffee therein; and means for preventing quick cooling of the lower vessel upon a reduction of the temperature of the heating element to prevent the return of the brewed coffee for a time sufficient to insure a proper coffee infusion.

10. In a vacuum type coffee maker comprising a lower vessel having an upper vessel superposed thereon, said upper vessel having a tube extending into said lower vessel through an aperture therein; a heating circuit including an electric heating element in series with a resistance element, a terminal connected to said circuit intermediate said elements; means for removably connecting said circuit to a source of current, said means comprising a connector plug having a normally open circuit connected to said terminal; means carried by said plug for storing a stopple for closing a pouring spout formed on said lower vessel; and means made operative by the reception of said stopple in said storage means for closing said normally open circuit to shunt the resistance element from said heating circuit to increase the temperature of said heating element, the removal of said stopple from said plug to close said spout opening said circuit to again place the resistance element in series circuit with said heating element to lower the temperature thereof.

11. In a vacuum type coffee maker comprising a lower vessel having an upper vessel superposed thereon, said upper vessel having a tube extending into said lower vessel through an aperture therein; a heating circuit including an electric heating element in series with a resistance element; a terminal at opposite ends of said circuit; a terminal connected to said circuit intermediate said elements; a connector plug having three terminal-receiving means thereon; means for connecting the means receiving the first-mentioned terminals to a source of current; a normally open circuit connecting the last-named terminal to said source; and means carried by said plug for storing a stopple for closing a pouring spout formed on said lower vessel, the reception of said stopple in said storage means closing said last-named circuit and short-circuiting the resistance element to operate the heating element at a high temperature, the removal of said stopple from said storing means automatically opening said circuit to again place the resistance element in series circuit with said heating element to lower the temperature thereof.

12. In a vacuum type coffee maker comprising a lower vessel having an upper vessel superposed thereon, said upper vessel having a tube extending into said lower vessel through an aperture therein; a heating circuit including an electric heating element in series with a resistance element; a terminal at opposite ends of said circuit; a terminal connected to said circuit intermediate said elements; a connector plug having three terminal-receiving means thereon; means for connecting the means receiving the first-mentioned terminals to a source of current; a normally open circuit connecting the last-named terminal to said source; means carried by said plug for storing a stopple for closing a pouring spout formed on said lower vessel, the reception of said stopple in said storage means closing said last-named circuit and short-circuiting the resistance element to operate the heating element at a high temperature, the removal of said stopple from said storing means automatically opening said circuit to again place the resistance element in series circuit with said heating element to lower the temperature thereof; and means for preventing quick cooling of the lower vessel upon the reduction of the temperature of the heating element.

13. A vacuum type coffee maker comprising a lower vessel and an upper vessel superposed on the lower vessel and having a tube extending into the lower vessel which is provided with a pouring spout; means for closing the spout so that water when heated in the lower vessel will be driven up into the upper vessel and returned to the lower vessel after the lower vessel has cooled; electric heating means including a circuit having a plurality of resistance units for heating the water in the lower vessel; a connector plug for removably connecting said circuit to a source of current; and means carried by said connector plug for controlling the circuit to vary the effective resistance of said units to effect a contact of the heat generated in said units, said means including storage means for said spout-closing means, the presence of the spout-closing means in said storage means causing a high heat to be generated in said units and a low heat when the spout-closing means is removed to close the spout.

HERBERT G. LEHMANN.